United States Patent [19]
Liang et al.

[11] 3,811,944
[45] May 21, 1974

[54] ELECTRIC CELL WITH CAPACITANCE BUFFER

[75] Inventors: Charles C. Liang, Andover, Mass.;
Bruce McDonald, Westcon, Conn.;
William F. Vierow, Acton, Mass.

[73] Assignee: R. R. Mallory & Co., Inc., Indianapolis, Ind.

[22] Filed: Mar. 12, 1973

[21] Appl. No.: 340,499

[52] U.S. Cl................ 136/6 R, 136/83 R, 136/153
[51] Int. Cl. .......................................... H01m 43/00
[58] Field of Search.... 136/6 R, 6 L, 100 M, 100 R, 136/153, 181, 83 R, 3, 179; 317/231, 232

[56] References Cited
UNITED STATES PATENTS

| 2,934,580 | 4/1960 | Neumann | 136/3 |
| 3,080,440 | 3/1963 | Ruetschi et al. | 136/3 |
| 3,288,641 | 11/1966 | Rightmire | 136/6 L |
| 3,513,027 | 5/1970 | Liang et al. | 136/83 R |
| 3,630,782 | 12/1971 | Butler | 136/100 M |

*Primary Examiner*—Anthony Skapars
*Attorney, Agent, or Firm*—Robert Levine

[57] ABSTRACT

An electric cell or battery is electrically combined with a capacitor in a common case, so the capacitor can serve as a buffer for the cell or battery. The case protects both and eliminates the need for a separate case for the capacitor.

10 Claims, 5 Drawing Figures

ELECTRIC CELL WITH CAPACITANCE BUFFER

This invention relates to a combination solid state battery and capacitor device to serve as a direct current energy source.

There are many applications in which an electric cell, or a battery consistiong of a combination of cells, is used as a source of energy that is called upon periodically, or discontinuously, for energy pulses. In many such applications, the circuitry into which the energy from the battery is fed includes an input condenser at the point of the input to the circuit. In many such cases, the electric cell or battery may be relatively small in physical dimensions and the power capacity of the cell is small, with components of correspondingly small dimensions and formed of compacted comminuted material.

A switching operation calling upon the cell for energy, has the characteristics of impact of stress, at full cell voltage, which may be particularly harmfully effective in cells with component elements of relatively small dimensions and of such comminuted materials, which might not be strongly bonded.

Usually such components are made highly porous, for greater electrode current surface availability, and the bonding may therefore be weak at certain random points, and therefore susceptible to damage from sudden steep-font stresses, such as full voltage demand for cell current by direct circuit closure.

As a matter of protecting such small cells, so they may be more efficient and effective in their desired operation, it is desirable to protect the cell from the possible harmful effects of such periodic switching and transient pulsing operations.

In the conventional circuitry, as now employed, the circuit connection between a cell, or battery, as a power source, and a capacitor at the input to a utilization circuit, includes a certain amount of resistance or impedance in the circuitry between the cell and the capacitor at the utilization circuit.

Here, it is desired to use a capacitor as a directly coupled buffer, closely coupled to the cell or battery, with a minimum of intervening resistance, so the stress on the cell or battery is substantially reduced or eliminated, at each circuit switching operation, by utilizing the capacitor to first start to supply current upon circuit demand and thus reduce the effective voltage height of the current demand pulse imposed on the cell or battery, at each switching operation in the uitilization circuit.

After the first connection of the capacitor across the cell, the cell charges the capacitor to full cell voltage level, which remains so during standby time. Any demand for energy by the utilization circuit thereafter then impresses the shock of circuit closure on the cell-capacitor unit, which can better take that shock, since the capacitor will first supply energy and will gradually lower its voltage according to the time constant of the entire related circuit, as the energy is drawn from the capacitor. The voltage demand across the cell will therefore not be a sudden steep front full voltage demand, but will vary according to the diminution in capacitor voltage according to that time constant. Thus the voltage of the demand pulse on the cell varies slowly from zero, instead of impacting as a unit function full voltage demand of a sudden switching operation.

The object of this invention, therefore, is to provide an electric cell, or battery, with a closely coupled capacitor, to serve as a buffer for the cell or battery, and to provide the energy of the cell, or the battery, to an external utilization circuit, with a reduced or eliminated impact stress effect on the cell or battery, upon the occurrence of each switching operation that couples or decouples the utilization circuit and the cell or battery.

Another object of the invention is to provide a combination battery and capacitor in a common enclosure to permit close electrical coupling of the cell or battery and the capacitor.

Another object of the invention is to provide an economical commercial structural combination.

For the purpose of the present invention, it is desirable that the coupling between the capacitor and the electric cell or battery be close, in order to limit the resistance between the cell, or battery, and the capacitor to a minimum value, to maximize the buffering benefit of the capacitor. In the following specification and claims, reference to a cell includes a battery, unless a specific limitation is indicated.

In accordance with this invention, the capacitor is therefore disposed within the cell container, to be closely connected to the cell terminals, to limit the resistance in the coupling circuitry between the capacitor and the cell; and, also, importantly as a matter of economy, to utilize the cell container as a protective enclosure for the capacitor also, and thereby to eliminate the need for a separate enclosure for the capacitor. The incorporation of the capacitor into the cell or battery container provides a small compact battery-capacitor energy device.

In the modification of the invention herein illustrated, the metal container of the electric cell is usually arranged to serve as one polarity terminal for the cell, as well as to contain the components of the cell. Alternatively, both terminals may be brought out. Here, a capacitor is disposed within the cell container, in a space insulatingly partitioned from the cell components, and the container as a whole enclosure is then sealed closed with a sealing element suitably provided with supports for two terminals. For that purpose, two through-type insulators are mounted on said sealing element to serve as supports for electrical conductors extending through said insulators to serve as external terminals, for connection to the combination cell and capacitor as an energy unit. For simple illustration, only a single cell combination is shown. For a multi-cell battery, the capacitor will be enclosed in the common housing for the battery.

Variations in packaging may be made to conform to any conventional form, including axial leads from opposite ends, or flat button types, or the like. The packaging design may take on any form to accommodate to local conditions.

The construction design of one modification of an energy unit, based on a single cell, is described in detail in the following specification, taken together with the accompanying drawing, in which FIG. 1 is a schematic sectional view of a combination battery-capacitor or cell-capacitor energy unit of this invention;

This invention generally involves the combination, of an electric cell, or of a battery of several cells, and a closely coupled capacitor, all disposed in a common housing to achieve several advantages. One main advantage of the close coupling relationship between the cell and the capacitor, is that the capacitor serves to act as a buffer, when the cell and capacitor unit is utilized in circuitry in which frequent switching and consequent frequent transients may occur. The switching operations tend to present sudden steep-front demands on the cell for energy, with consequent response of electrochemical action having characteristics similar to impact on a physical mechanical system. The capacitor, when used in close coupled relationship with such a cell, serves as a buffer and as a reservoir from which energy may be first rapidly drawn from service in the accompanying circuitry, while the capacitor then, in turn, calls upon the cell for energy replenishment, but gradually and at a lower voltage differential demand, so that the electrochemical impact on the cell components is tremendously reduced, and the cell or battery life is greatly extended.

The specific advantage in this protective action of the capacitor on the cell, with the capacitor located where it is closely coupled to the cell or battery, is the fact that the resistance between the electric cell and the capacitor is reduced to a minimum, so that there is very little resistance in the coupling between the cell and the capacitor that would introduce a voltage drop in the coupling between them, that would absorb and waste energy of the cell or battery upon demand from an external utilization circuit.

Another feature and advantage of the close coupling of the capacitor to the electric cell is the utilization of a single common container can, which in some usages, may serve as one electrode of the electric cell, and which is arranged and provided to serve also as a protective container for the capacitor. This arrangement eliminates the need for a separate enclosure for the capacitor and contributes to the economy of the cell and the capacitor combined as a unit. Similarly, with a battery of several cells, a common container serves also to enclose the capacitor, with electrodes appropriately provided.

Figure 1:
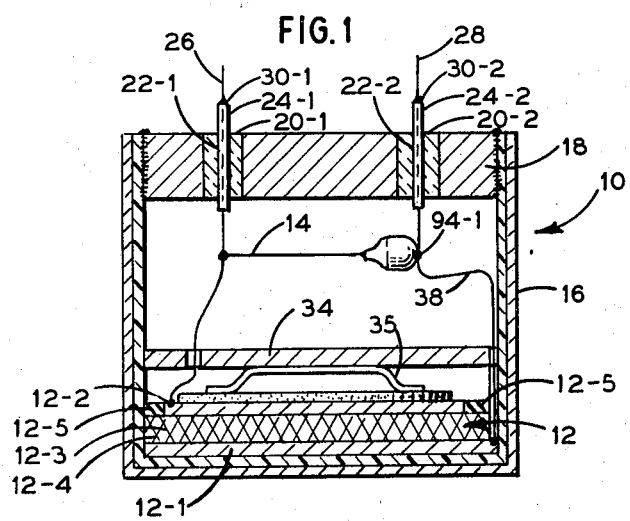

As illustrated in the schematic arrangement shown in FIG. 1, as one typical arrangement, a buffered direct current power source 10 is shown as including an electric cell 12 combined with an electrolytic capacitor 14, in a common hollow metal container can or case 16, which may serve as one terminal element for the electric cell 12, and which will serve also as a common terminal element for the electrolytic capacitor 14. The capacitor is preferably solid state for convenient packaging.

The metal case 16, which is generally in the form of a hollow cylindrical cup, is initially open at the top to receive the component elements of the cell 12 and of the capacitor 14, after which the case 16 is closed for hermetic sealing by the insertion of a metal disc top 18, slip-fitting easily into the open end of the case 16, after which the metal disc top 18 is then welded or soldered to the case 16 along the peripheral area of mutual contact.

The metal top 18, as here employed, is provided with two glass tubular insulators 20-1 and 20-2, externally sealed to the metal top 18, and each embodying a central axial passage 22-1 and 22-2, in each of which a metallic tubular sleeve 24-1 and 24-2 is hermetically sealed to, and in, the glass tubular insulator, with the two tubular sleeves 24-1 and 24-2 serving as conduits through which two electrode leads 26 and 28, respectively, are disposed to extend down into the case 16 for appropriate connection to the components, to provide two terminals for common connection to the polar terminals of the cell and of the capacitor. The two metal leads 26 and 28 are sealed at the front originally open ends of the tubular sleeves 24-1 and 24-2, with small ball solder seals 30-1 and 30-2.

The case 16 may be evacuated upon the completion of the assembly and before the ball solder seals 30-1 and 30-2 are formed at the outer ends of the metal feed-through tubes 24-1 and 24-2.

In the arrangement here shown, with the two terminals coming out of the case, greater flexibility in connection to an external circuit is provided. In the case shown, the outer surface of the metallic case 16 may or may not additionally be utilized as one terminal or polar electrode of the cell-capacitor energy unit 10.

In the arrangement here shown, the cell 12 includes a cathode structure 12-1, an anode structure 12-2, a spacer or separator structure 12-3, between the anode and the cathode, and an electrolyte 12-4 schematically indicated as disposed between the anode and the cathode and arranged to be electrically and chemically ionically active between the cathode 12-1 and the anode 12-2. The solid-state construction may be similar to that shown in U.S. Pat. No. 3,513,027, dated May 19, 1970.

In order to isolate the anode 12-2 from the metal case 16, which is at cathode potential, a suitable insulator, schematically shown as an insulating washer 12-5, is disposed to surround the anode component 12-2 to insulate the anode from the metal case 16.

In order to provide some separation between the cell region in the metal case 16, and the space reserved for the electrolytic capacitor 14, a simple separator 34 is employed, which serves as an electronic insulator and also as a reaction wall for a pressure spring 35 to compress the component elements of the cell.

Since the metal case 16 serves as an enclosure for the capacitor 14, the usual cover or casing for such a capacitor may be omitted, or a less expensive enclosure employed, leaving reliance upon the metal case 16 to serve also to cover and protect the capacitor 14.

In the arrangement shown, the cathode of the cell is disposed to engage the bottom of the metal case 16, and an anode conductor or collector 36 is brought out, as shown, through the metal feed-through tube 24-1 to serve as an electric terminal 26 for the energy unit 10. The metal case 16 may itself be employed as a terminal or polar surface for the cathode of the cell-andcapacitor combination. Alternatively, a separate conductor, suitably connected to the cell, or even down to the cathode element itself in the cell, may be utilized, shown as conductor 38, to serve also as a terminal for the capacitor 14, and then extend up through the cover seal top 18 and the metal feedthrough tube 24-2, to provide a cathode terminal 28 for the combination battery-and-capacitor energy unit.

Where a multi-cell battery is involved, the case may be utilized as one battery terminal, with the outer-cell circuitry appropriately arranged. However, generally, a housing of non-metal material will be employed, and terminals separately provided, and suitably insulated and supported from the housing.

Figure 2:
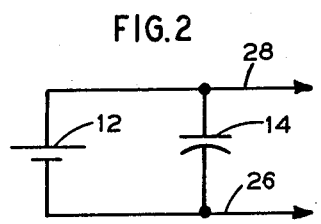
FIG. 2 is a circuit diagram showing the permanent connection of the capacitor across the terminals of the battery or cell with the circuit terminals of the battery or cell and capacitor combination available for connection to an external circuit.

As shown in FIG. 2, the capacitor 14 is connected permanently across the terminals of the cell 12, or the battery where several cells are utilized, so the external terminals 26 and 28 provide connections from the combination cell or battery and capacitor to an external circuit.

When the capacitor 14 is first connected across the terminals of the cell 12, during manufacturing assembly, the capacitor becomes charged to the full cell voltage. When an external circuit is later connected to the battery-capacitor unit, the capacitor first supplies energy to the external circuit and the voltage of the capacitor correspondingly drops. Thereupon, and as the capacitor voltage is dropping, the battery supplies energy to refill the capacitor as an energy reservoir, and the voltage of the capacitor is thereupon restored to the instantaneously maximum value of the cell at that time. As circuit demands are made on the cell-capacitor or battery-capacitor combination for energy, the same condition recurs, namely, energy is immediately supplied from the capacitor which thereupon drops its voltage, and the cell then responds to the difference in voltage between the cell and the capacitor to supply energy to recharge the capacitor.

Figure 3:
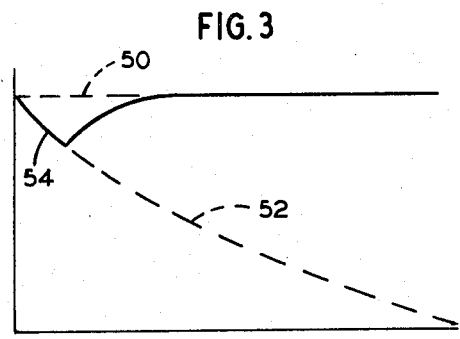
FIG. 3 is a schematic graph illustrating schematically how the voltage drops from its normal cell voltage upon demand for energy, and then has its voltage restored to the level of the cell voltage as the cell supplies restoring energy to the capacitor.

FIG. 3 shows schematically and in exaggerated form, how the capacitor voltage changes. The top graph line 50 represents normal full voltage of the cell or battery, with no load. It also represents capacitor full voltage with no load. Upon first connection of the external circuit, the capacitor voltage 54 drops toward and upon a graph locus 52, whose shape is determined by the time constant of the connected external circuit. The capacitor voltage drops only through a short section or length, when the cell or battery begins to restore energy to the capacitor along line section 54 to a value approaching instantaneous battery voltage 50.

The battery, or cell, as the case may be, then supplies energy to the capacitor to restore capacitor voltage, and supplies energy to the external circuit, with the capacitor serving as a reserve. The capacitor thus serves as a buffer to take the first shock of energy demand, upon connection of an external circuit.

The advantage of this feature is that after the first charging of the capacitor, upon its first connection across the cell, any future demands for energy impose the initial energy demand shock on the capacitor, and the voltage differential between the reduced voltage of the capacitor and the cell normal voltage, stirs the cell into supplying restorage energy to the capacitor. However, the voltage demand, as a differential applied to the cell, is substantially less than a voltage differential that would be applied to the cell directly upon connection of the load circuit directly to the cell. This cell unit, including the capacitor, is easier on the cell, or battery, than on the cell alone and permits more frequent power demands.

Figure 4:
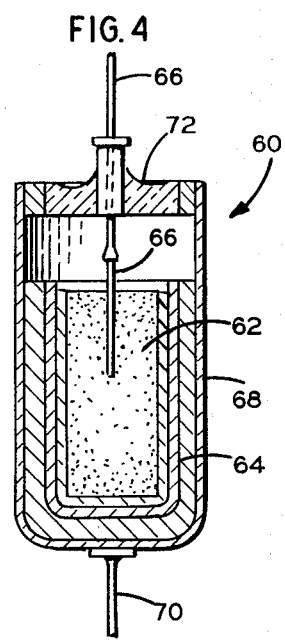
FIG. 4 is a schematic sectional view of one type of a solid electrolyte tantalum capacitor.

FIG. 4 shows, schematically, a conventional solid electrolyte tantalum capacitor 60, in which dielectric and metallic ingredients including a body 62 of sintered anode powder mixed with manganese dioxide is covered with a graphite coating and an outer metallic coating 64, with an anode conductor 66 extending down into the body of sintered anode powder 62 and insulated from the outer metallic coating 64; and with a metal can 68 as a container to serve as a cathode with a lead wire 70 attached, and a closure 72 for the container can to insulatingly support the anode conductor 66.

In the combination cell and capacitor here disclosed, the metal can 68 and closure 72 of the capacitor 60 can be omitted since the combination cell case 16 of this disclosure, will serve as a common housing and enclosure can.

Figure 5:
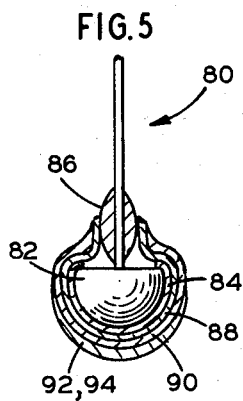
FIG. 5 is a side elevational view, partially in section, of another type of capacitor which may be included with the cell or battery.

FIG. 5 shows another form of conventional solid state electrolytic capacitor 80, in which the lower end as a bulbous tantalum head 82 is covered by sequentially superposed layers of material to provide the solid state electrolyte between two terminal surfaces, which may be connected across the cell or battery to be buffered. The head 82 is covered in sequence by a sprayed deposition 84 of tantalum powder, then sintered an anodized, a layer of mylar 86 bonded in place, a covering of manganese dioxide 88, with a graphite coating 90, followed by a silver coating 92, and a top solder coating 94, to which an external terminal connection may be made.

The combined cell-and-capacitor, or battery-and-capacitor, energy unit may take different forms and the elements may be designedly differently arranged, without departing from the spirit and scope of the invention as defined in the claims.

What is claimed is:

1. A solid state electric battery, comprising
   a hollow metallic container, having an originally open end and defining a chamber space;
   an electric cell in a portion of said container space, and having two electrodes available for connection to an external circuit;
   a capacitor disposed in said container and electrically connected between said two electrodes;
   an insulator closure for said original open end, for closing said chamber space and hermetically sealing said container;
   terminal means supported on said insulator closure to provide electrically conductive access to said cell and capacitor unit as an energy source;
   and means within said container connecting the electrodes of the cell and of the capacitor to said terminal means.

2. A solid state electric battery, as in claim 1, in which
   said cell includes a cathode, engaging an inner surface of said container; an anode spaced from said cathode and insulatingly supported away from direct electrical contact with said container; with a physical separator and an electrolyte between said cathode and said anode;
   partition means in said container to subdivide said total chamber space into two spaces: one space to accommodate the cell, and a separate second space to accommodate the capacitor.

3. A solid state electric battery, as in claim 1, in which
said insulator closure embodies a metal closure disc to be hermetically mechanically sealed to said metallic container;
insulating means on said closure for supporting electrode terminals for said source, electrically coupled to the terminals of the combined cell and capacitor as a unit energy source.

4. A solid state electric battery, as in claim 3, in which
each said insulating means in said closure consists of an insulator having a through passage and an electrical conductor extending through said insulator, and means for hermetically sealing the outer end of said through passage.

5. A solid state electric battery, as in claim 4, in which
said insulator with through passage consists of an insulation glass support sealed to said metal top and a current conductor extending through said glass support to provide an external terminal for an inside cell element,
and means for hermetically sealing said conductor with respect to said cell against ambient atmosphere.

6. A solid state electric battery, as in claim 1, in which
said electric cell in said container space is disposed to embody a portion of said conductive metallic container as an electrode element of said cell, with the other cell electrode free;
and said capacitor disposed in said container is electrically connected between said other cell electrode and a point on said metallic container;
with said insulator closure provided for said original open end;
and said terminal means are supported on said insulator closure to provide electrically conductive access to said cell and capacitor combination as a unit energy source.

7. A solid state electric battery, as in claim 1, in which
a partition subdivides said chamber space into separate compartments;
and said electric cell and said capacitor are in said separate compartments of said chamber space.

8. A solid state electric battery, as in claim 7, in which
said partition serves as a reaction-pressure confining wall for maintaining said cell under pressure for optimum operating condition.

9. A solid state electric battery, as in claim 2, in which
an annular insulating ring surrounds said anode to separate and insulate said anode from said container.

10. A solid state electric battery, as in claim 7, in which
a resilient pressure element is disposed between said partition and the anode of said cell to hold said cell under pressure for optimum operating condition.

* * * * *